US012037843B2

(12) United States Patent
Liang

(10) Patent No.: US 12,037,843 B2
(45) Date of Patent: Jul. 16, 2024

(54) CONTROL ROPES GUIDE DEVICE FOR WINDOW CURTAIN

(71) Applicant: Wen Ying Liang, Changhua County (TW)

(72) Inventor: Wen Ying Liang, Changhua County (TW)

(73) Assignee: CHING FENG HOME FASHIONS CO., LTD., Changhua County (TW)

( * ) Notice: Subject to any disclaimer, the term of this patent is extended or adjusted under 35 U.S.C. 154(b) by 73 days.

(21) Appl. No.: 17/566,616

(22) Filed: Dec. 30, 2021

(65) Prior Publication Data

US 2022/0403699 A1 Dec. 22, 2022

(30) Foreign Application Priority Data

Jun. 17, 2021 (TW) ................................ 110207020

(51) Int. Cl.
*E06B 9/327* (2006.01)
*E06B 9/302* (2006.01)
*E06B 9/322* (2006.01)
*E06B 9/262* (2006.01)

(52) U.S. Cl.
CPC .............. *E06B 9/327* (2013.01); *E06B 9/302* (2013.01); *E06B 9/322* (2013.01); *E06B 9/262* (2013.01); *E06B 2009/2625* (2013.01); *E06B 2009/3225* (2013.01)

(58) Field of Classification Search
CPC .......... E06B 9/327; E06B 9/302; E06B 9/322; E06B 2009/3225; E06B 2009/3222
See application file for complete search history.

(56) References Cited

U.S. PATENT DOCUMENTS 3,352,349 A * 11/1967 Hennequin ............. E06B 9/308 160/171
4,872,499 A * 10/1989 Anderson ............... E06B 9/362 160/173 V
5,267,598 A * 12/1993 Marocco ................. E06B 9/307 160/176.1 R
5,799,715 A * 9/1998 Biro ........................ E06B 9/322 160/170
7,493,932 B2 * 2/2009 Cheng ..................... E06B 9/323 160/173 R
8,662,135 B2 * 3/2014 Lin ......................... E06B 9/322 160/170
8,925,615 B2 * 1/2015 Lin ......................... E06B 9/322 160/170
9,181,751 B1 * 11/2015 Hong ........................ E06B 9/28
9,297,203 B2 * 3/2016 Hsueh-Cheng ......... E06B 9/322
9,689,199 B1 * 6/2017 Chen ........................ E06B 9/327
9,765,565 B2 * 9/2017 Morris ...................... E06B 9/262
10,119,329 B2 * 11/2018 Anderson ............... E06B 9/304
(Continued)

FOREIGN PATENT DOCUMENTS

CN 205135370 U * 4/2016 ............. E06B 9/303

*Primary Examiner* — Johnnie A. Shablack
(74) *Attorney, Agent, or Firm* — Ying-Ting Chen; Law Office of Michael Chen

(57) ABSTRACT

A control rope guide device for a window curtain assembly includes a bottom part and a top part. The top part is connected to the top of the bottom part. The control rope guide device is cooperated with the window curtain assembly to separate two control ropes apart from each other so as to smoothly expand or lift the curtain.

9 Claims, 6 Drawing Sheets

(56) References Cited

U.S. PATENT DOCUMENTS

| | | | | |
|---|---|---|---|---|
| 10,550,635 | B2 * | 2/2020 | Lin | E06B 9/324 |
| 10,641,039 | B2 * | 5/2020 | Chen | E06B 9/322 |
| 10,704,323 | B2 * | 7/2020 | Chen | E06B 9/322 |
| 10,876,353 | B2 * | 12/2020 | Hummel | E06B 9/264 |
| 10,988,980 | B2 * | 4/2021 | Chou | E06B 9/322 |
| 2013/0087296 | A1 * | 4/2013 | Mullet | E06B 9/262 160/405 |
| 2015/0259976 | A1 * | 9/2015 | Hsueh-Cheng | A47H 1/04 160/368.1 |
| 2016/0222722 | A1 * | 8/2016 | Schulman | E06B 9/68 |
| 2017/0067288 | A1 * | 3/2017 | Nien | E06B 9/322 |
| 2017/0342770 | A1 * | 11/2017 | Chen | E06B 9/322 |
| 2018/0347267 | A1 * | 12/2018 | Dekker | E06B 9/307 |
| 2018/0347269 | A1 * | 12/2018 | Wang | E06B 9/30 |
| 2019/0093426 | A1 * | 3/2019 | Huang | E06B 9/262 |
| 2019/0242186 | A1 * | 8/2019 | Chou | E06B 9/304 |
| 2020/0157879 | A1 * | 5/2020 | Lei | E06B 9/305 |
| 2021/0025227 | A1 * | 1/2021 | Liu | E06B 9/322 |
| 2021/0079722 | A1 * | 3/2021 | Liang | E06B 9/262 |
| 2021/0079723 | A1 * | 3/2021 | Liang | E06B 9/327 |
| 2022/0205316 | A1 * | 6/2022 | Chen | E06B 9/322 |
| 2022/0341255 | A1 * | 10/2022 | Luo | E06B 9/305 |

* cited by examiner

CONTROL ROPES GUIDE DEVICE FOR WINDOW CURTAIN

BACKGROUND OF THE INVENTION

1. Fields of the Invention

The present invention relates to a control ropes guide device, and more particularly, to a control ropes guide device that makes the two control ropes to be operated smoothly.

2. Descriptions of Related Art

The conventional cordless window curtain generally includes a scrolling device located within the top rail to control the operation of the two control ropes of the window curtain. The two control ropes are respectively connected to the bottom rail so as to lift or lower the bottom rail according to needs.

Specifically, the bottom board of the top rail includes two bores and a rivet is located in each of the two bores so that the control ropes extend through the two rivets with less friction. However, the rivet and the top board and the bottom board of the scrolling device form a right triangle, so that the control ropes may be tangled or interfere with each other during operation. This may cause the curtain to be expand or lifted in an unbalance status, or even fail to operate the curtain.

In addition, because there is only one scrolling device in the top rail, the single scrolling device cannot control two or more than two sections of the curtain. Even more sets of the scrolling devices are equipped, the control ropes still have the similar problems as mentioned above.

The present invention intends to provide a control rope guide device to eliminate shortcomings mentioned above.

SUMMARY OF THE INVENTION

The present invention relates to a control rope guide device for a window curtain assembly, and the control rope guide device is connected to the window curtain assembly so as to separate two control ropes and which operates the window curtain assembly smoothly and stably.

The control rope guide device of the present invention comprises a bottom part and a top part which is connected to the top of the bottom part. The bottom part includes an upright portion, and two flanges respectively extend from two lower portions of two respective ends of the upright portion. A hole is defined centrally through the upright portion. The upright portion includes two grooves, and each groove extends upward toward the bore from the flange corresponding thereto. Each groove includes a plate located therein. A rivet is engaged with the hole.

The top part includes a handle, two protrusions and two hooks. Two bridges are respectively formed between the two protrusions and the handle. The two hooks extend from the underside of the top part. Each of the protrusions includes a recess defined therein. The two respective recesses are respectively defined through the bottom of the top part. Each recess receives a rod. The two hooks hook the two plates in the two grooves to connect the top part to the bottom part.

Preferably, the upright portion is a hollow case which includes multiple openings. An inclined wing is located between two adjacent openings.

Preferably, the rivet is made of metal or durable material.

Preferably, the handle includes an anti-slip face coated thereto.

Preferably, the rods are cylindrical rods and made of metal or durable material.

Preferably, the hooks each include an arm and a hook end.

Preferably, the anti-slip face of the handle includes bosses, ridges or grooves.

Preferably, the window curtain assembly comprises a top rail, a middle rail and a bottom rail. The top rail includes a separation bottom, and two bores are defined through the separation bottom. A first curtain is connected between the middle rail and the top rail. A second curtain is connected between the middle rail and the bottom rail. The bottom part is connected to the separation bottom of the top rail. The upright portion extends through the bores to connect the bottom part to the separation bottom. The hooks of the top part hook the plates of the bottom part.

A first scrolling member and a second scrolling member are located in the top rail. The first scrolling member includes a first top board and a first bottom board, and two first scrolling wheels and two first driving wheels are located between the first top board and the first bottom board. The second scrolling member including a second top board and a second bottom board, and two second scrolling wheels and two second driving wheels are located between the second top board and the second bottom board. Multiple columns are respectively connected between the first/second top board and the first/second bottom board. The two first scrolling wheels are engaged with the two first driving wheels. A first spring drives the two first driving wheels so as to drive each of the first scrolling wheels. The two second scrolling wheels are engaged with the two second driving wheels. A second spring drives the two second driving wheels so as to drive each of the second scrolling wheels.

Two first control ropes each have a first end connected to the first scrolling wheel corresponding thereto. A second end of each of the first control ropes extends through the rivet engaged with the hole of the bottom part and the first curtain, and is connected to the middle rail.

Two second control ropes each have a first end connected to the second scrolling wheel corresponding thereto. A second end of each of the second control ropes extends through the rivet engaged with the hole of the bottom part and the first and second curtains, and is connected to the bottom rail. The rods of each top part separate the first and second control ropes apart from each other.

The recovery force from each of the first and second springs drives the first and second driving wheels to rotate, and the first and second driving wheels respectively drive the first and second scrolling wheels to rotate, so that the first scrolling wheels operate the first control ropes to lift or lower the middle rail to collect or expand the first curtain. Alternatively, the second scrolling wheels operate the second control ropes to lift or lower the bottom rail to collect or expand the second curtain.

Preferably, multiple pillars are connected between the first/second top board and the first/second bottom board. The pillars guide the first and the second control ropes.

Preferably, the first curtain is an empty space, or the first curtain includes different levels of light transmittance compared with that of the second curtain.

The primary object of the present invention is to provide a control ropes guide device for a window curtain assembly which includes a first curtain and a second curtain. The two control ropes that respectively control the operation of the first and second curtains are separated from each other so that the first and second control ropes respectively wrap to the correspondent scrolling wheel. The first and second control ropes do not interfere each other. No screw is needed to connect the top part to the bottom part of the control ropes guide device.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
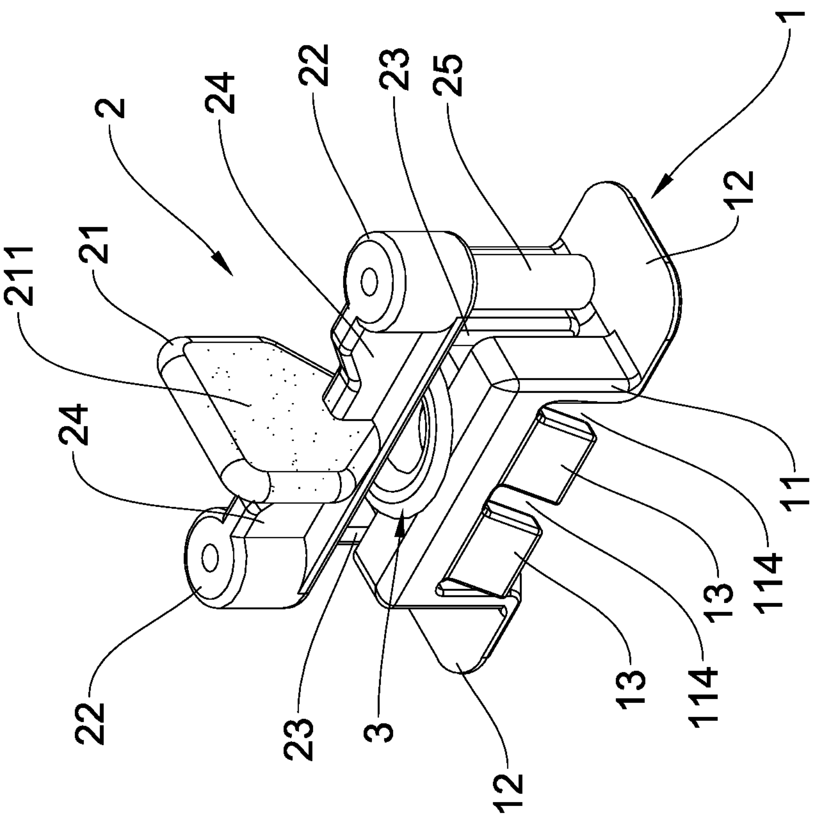
FIG. 1 is a perspective view to show the control ropes guide device of the present invention.
Figure 2:
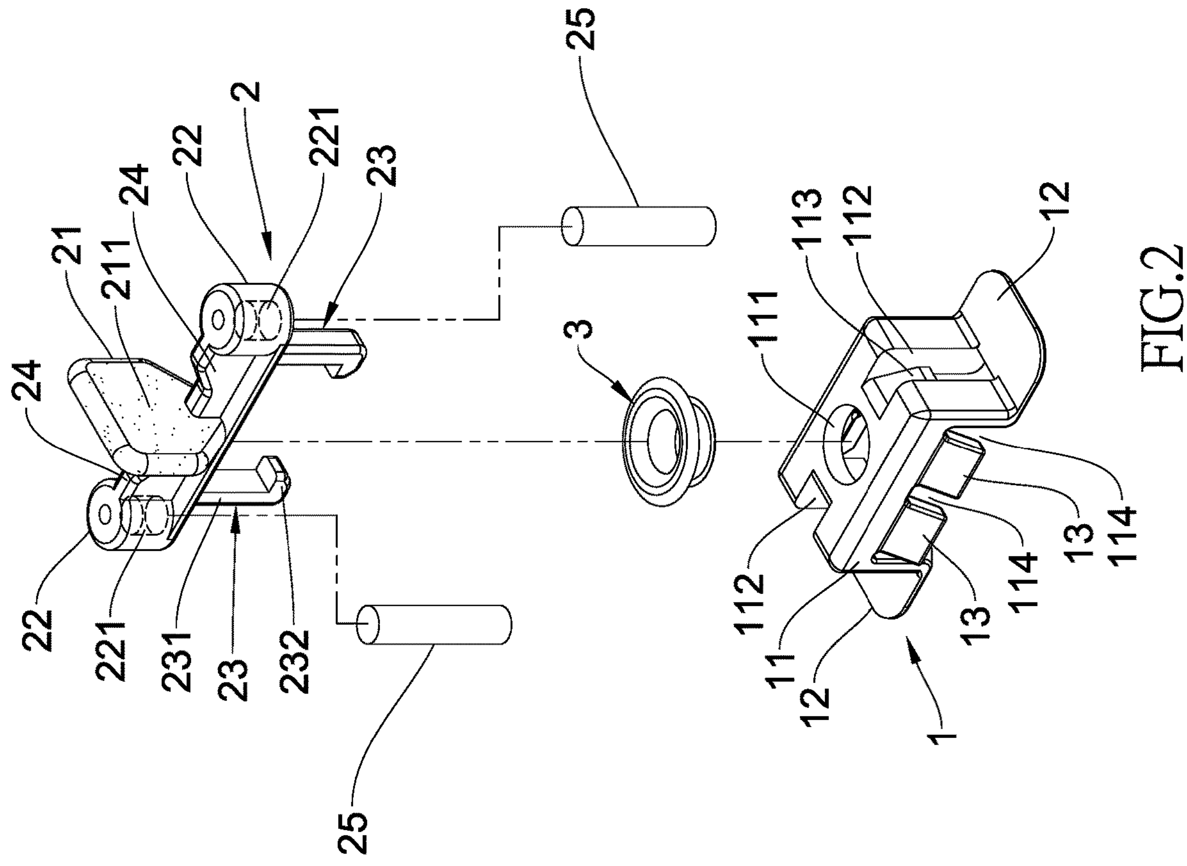
FIG. 2 is an exploded view of the control ropes guide device of the present invention.

Referring to FIGS. 1 and 2, the control rope guide device for a window curtain assembly of the present invention comprises a bottom part 1 and a top part 2 which is connected to the top of the bottom part 1. The control rope guide device is connected to the window curtain assembly so as to separate two control ropes. The bottom part 1 includes an upright portion 11, and two flanges 12 respectively extend from two respective lower portion of two respective ends of the upright portion 11. A hole 111 is defined centrally through the upright portion 11. The upright portion 11 further includes two grooves 112, and each groove 112 extends upward toward the hole 111 from the flange 12 corresponding thereto. Each groove 112 includes a plate 113 located therein. A rivet 3 engaged with the hole 111, and the rivet 3 is made of metal or durable material. The upright portion 11 is a hollow case which includes multiple openings 114, and an inclined wing 13 is located between two adjacent openings 114. The inclined wings 13 are made by plastic with proper flexibility.

The top part 2 includes a handle 21, two protrusions 22 and two hooks 23. Two bridges 24 are respectively formed between the two protrusions 22 and the handle 21. The two hooks 23 extend from the underside of the top part 2. Each of the protrusions 22 is a cylindrical part and includes a recess 221 defined therein. The two respective recesses 221 are respectively defined through the bottom of the top part 2, so that each recess 221 receives one end of a rod 25. The two hooks 23 hook the two plates 113 in the two grooves 112 to connect the top part 1 to the bottom part 2.

The top part 2 is made by way of plastic injection molding, and the handle 21 includes an anti-slip face 211 coated thereto which may include bosses, ridges or grooves such that the user can grab the handle easily. The rods 25 are cylindrical rods and made of metal or durable material to guide the first and second control ropes L1, L2 which will be described later. The hooks 23 each include an arm 231 and a hook end 232 which is formed to the distal end of the arm 231. The hook end 23 is used to hook the plate 113. The distance between the top part 2 and the bottom part 1 can be adjusted by the arms 231 with different lengths. The distance provides a room for operation for the first and second control ropes L1, L2.

Figure 3:
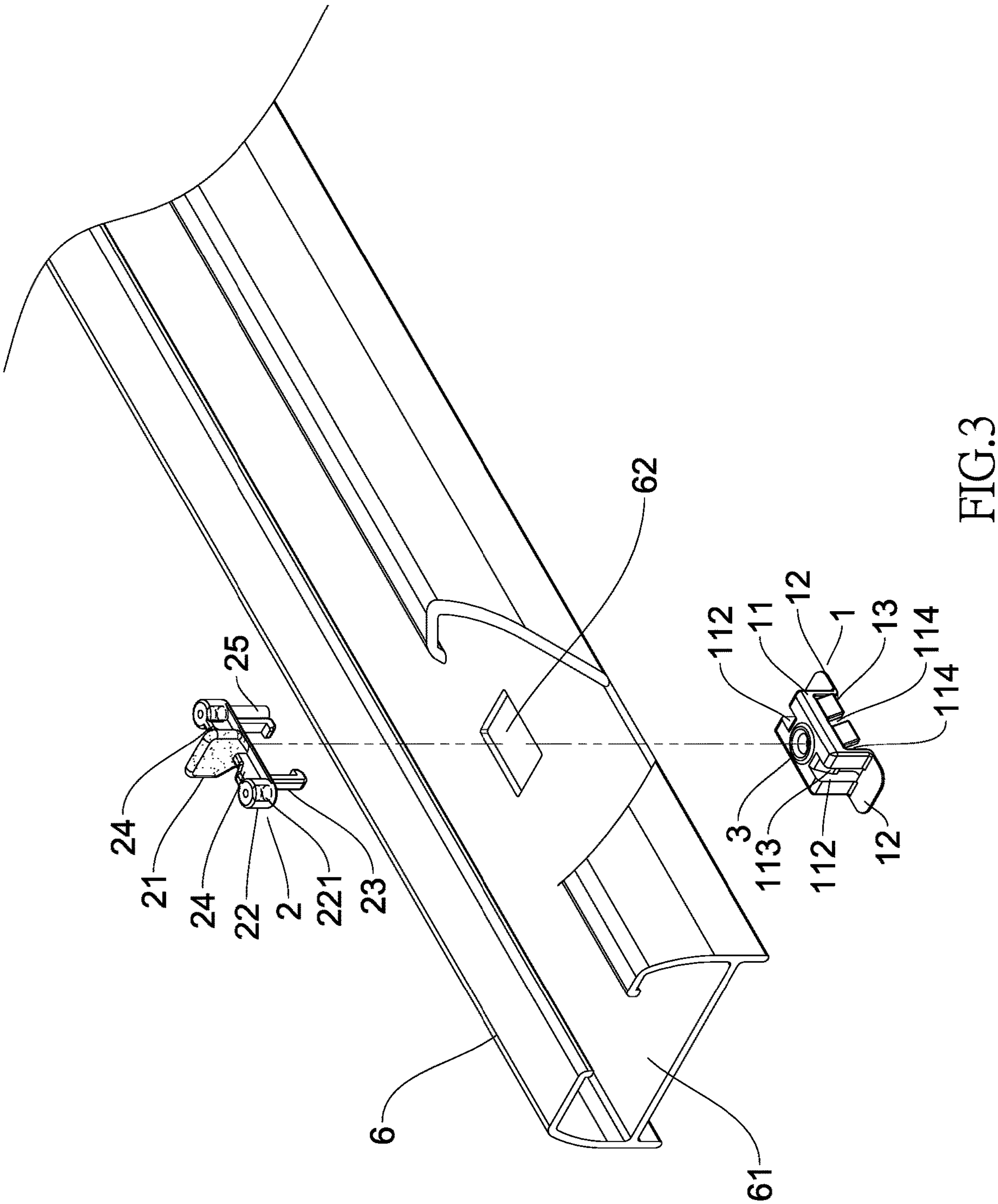
FIG. 3 is an exploded view to show the control ropes guide device of the present invention and the top rail of the window curtain assembly.
Figure 4:
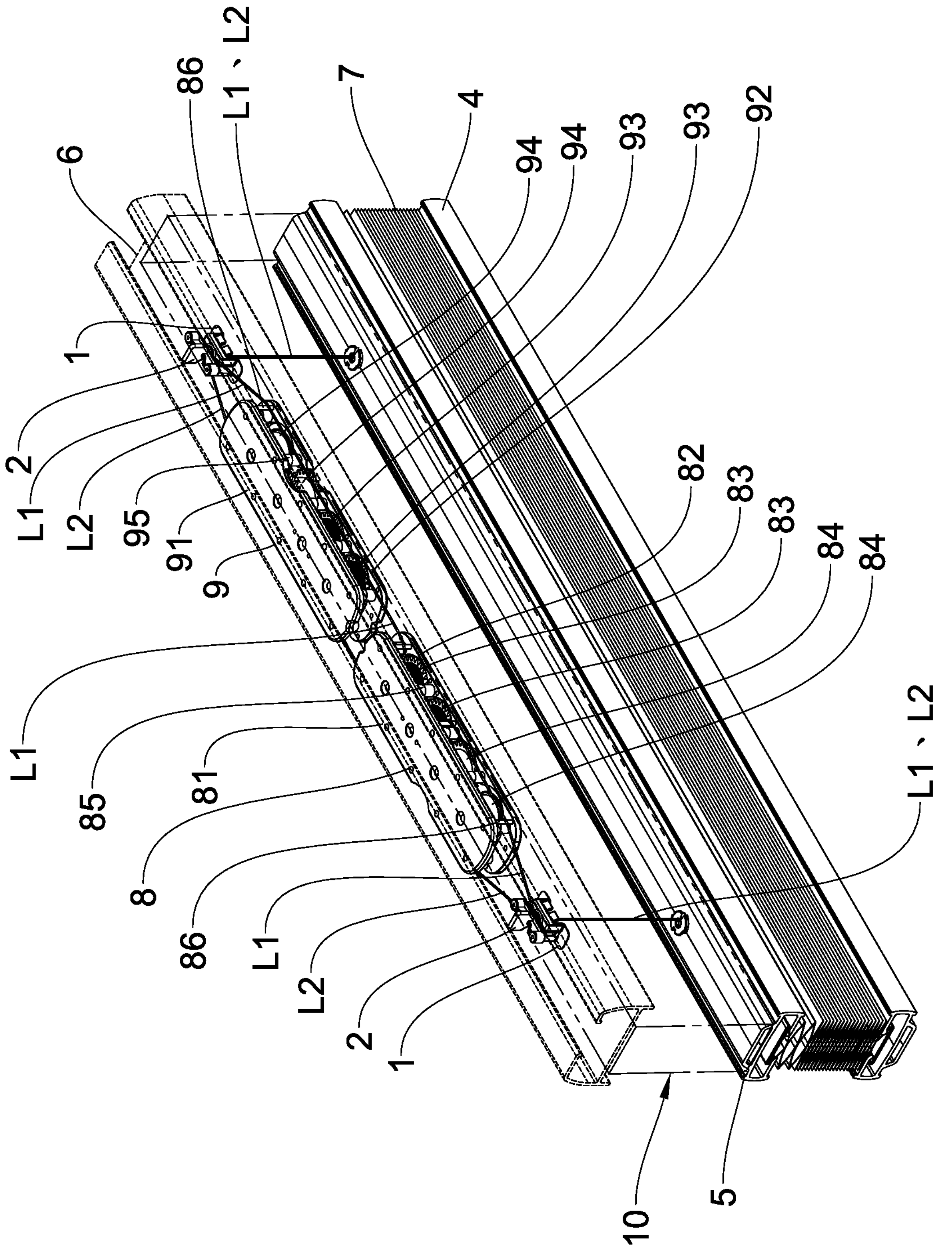
FIG. 4 illustrates that two control ropes guide devices of the present invention are installed to the top rail of the window curtain assembly.
Figure 5:
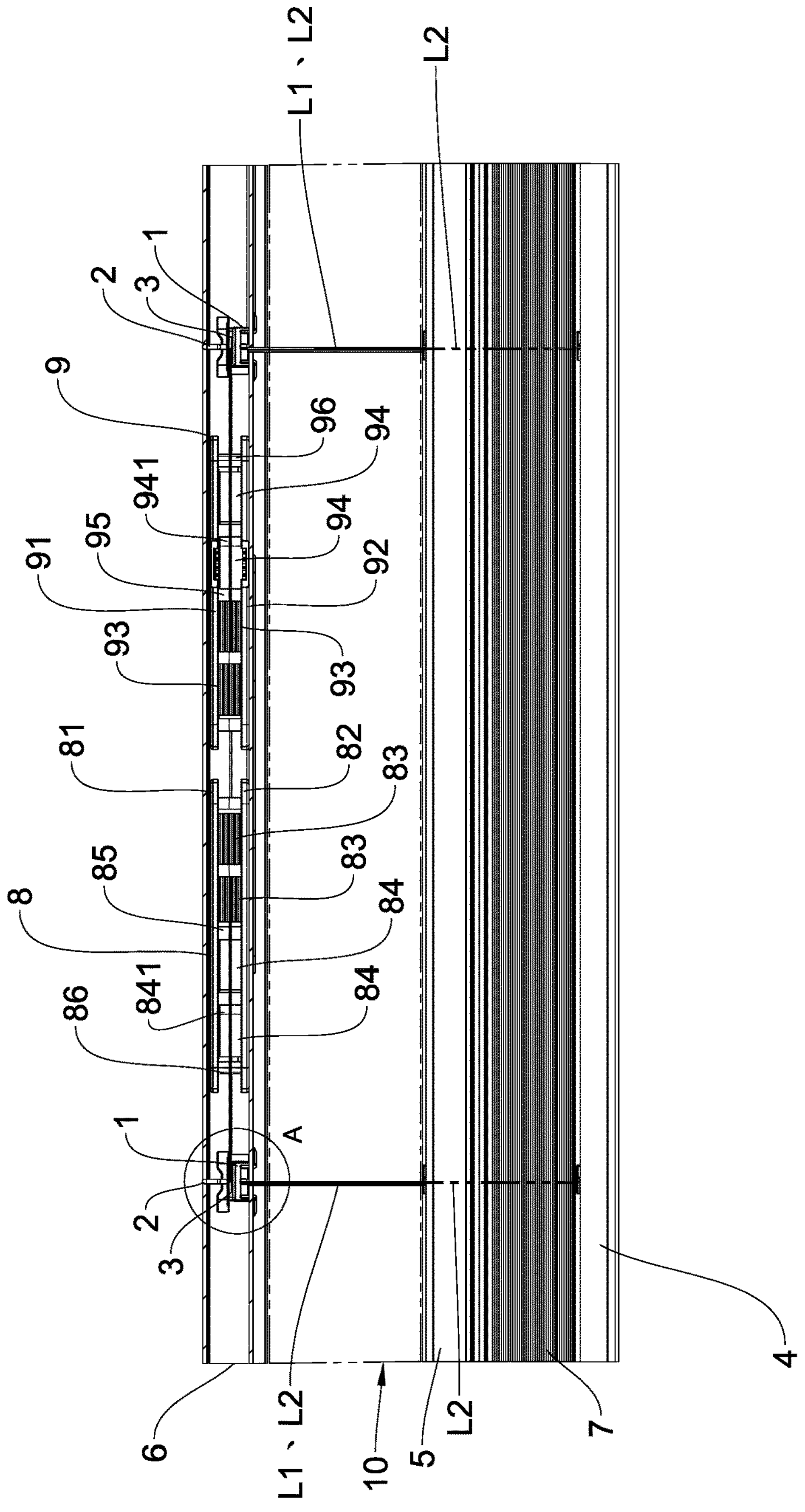
FIG. 5 is the front view of the disclosure in FIG. 4.

As shown in FIGS. 3 to 5, the window curtain assembly comprises a top rail 6, a middle rail 5 and a bottom rail 4. The top rail 6 includes a separation bottom 61, and two bores 62 are defined through the separation bottom 61. A first curtain 10 is connected between the middle rail 5 and the top rail 6, and a second curtain 7 is connected between the middle rail 5 and the bottom rail 4. The first curtain 10 can be an empty space, or the first curtain 10 includes different levels of light transmittance compared with the second curtain 7.

The bottom part 1 is connected to the separation bottom 61 of the top rail 6. The upright portion 11 extends through the bores 62 from the underside of the separation board 61 of the top rail 6 so as to connect the bottom part 1 to the separation bottom 61. The wings 13 contact the top face of the separation board 61, and the flanges 12 contact the bottom face of the separation board 61. The hooks 23 of the top part 2 hook the plates 113 of the bottom part 2.

As shown In FIGS. 4 and 5, a first scrolling member 8 and a second scrolling member 9 have an identical structure and are located in the top rail 6. The first scrolling member 8 includes a first top board 81 and a first bottom board 82. Two first scrolling wheels 83 and two first driving wheels 84 are located between the first top board 81 and the first bottom board 82. The second scrolling member 9 includes a second top board 91 and a second bottom board 92. Two second scrolling wheels 93 and two second driving wheels 94 are located between the second top board 91 and the second bottom board 92. Multiple columns 85, 95 are respectively connected between the first/second top board 81/91 and the first/second bottom board 82/92.

The two first scrolling wheels 83 are engaged with the two first driving wheels 84. A first spring 841 drives the two first driving wheels 84 so as to drive each of the first scrolling wheels 83. The two second scrolling wheels 93 are engaged with the two second driving wheels 94. A second spring 941 drives the two second driving wheels 94 so as to drive each of the second scrolling wheels 93.

Two first control ropes L1 each have a first end connected to the first scrolling wheel 83 corresponding thereto, and a second end of each of the first control ropes L1 extends through the rivet 3 engaged with the hole 111 of the bottom part 1 and the first curtain 10, and is connected to the middle rail 5.

Two second control ropes L2 each have a first end connected to the second scrolling wheel 93 corresponding thereto, and a second end of each of the second control ropes L1 extends through the rivet 3 engaged with the hole 111 of the bottom part 1 and the first and second curtains 10, 7, and is connected to the bottom rail 4. The rods 25 of each top part 2 separate the first and second control ropes L1, L2 apart from each other.

The recovery force from each of the first and second springs 841, 941 drives the first and second driving wheels 84, 94 to rotate, and the first and second driving wheels 84, 94 respectively drive the first and second scrolling wheels 83, 93 to rotate, so that the first scrolling wheels 83 operate the first control ropes L1 to lift or lower the middle rail 5 to collect or expand the first curtain 10. Alternatively, the second scrolling wheels 93 operate the second control ropes L2 to lift or lower the bottom rail 4 to collect or expand the second curtain 7.

Besides, multiple pillars 86/96 are connected between the first/second top board 81/91 and the first/second bottom board 82/92. The pillars 86/96 guide the first and the second control ropes L1, L2.

Figure 6:
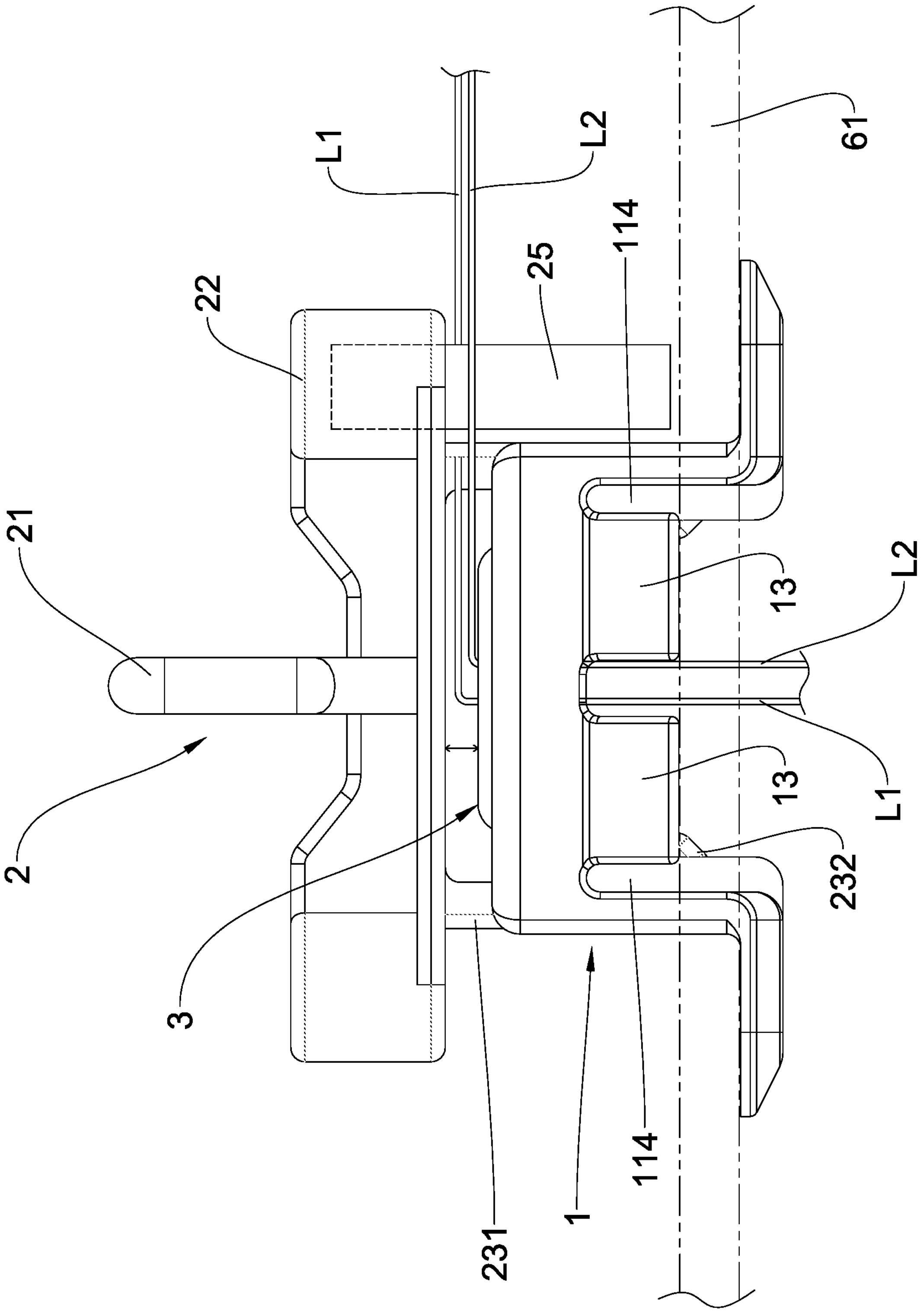
FIG. 6 is an enlarged view of the circled "A" in FIG. 5.

As shown in FIGS. 5 and 6, the window curtain assembly includes the first and second control ropes L1, L2, and the first and second control ropes L1, L2 are separated from each other as shown in FIG. 6 which shows that the first and second control ropes L1, L2 are separated by the rods 25. The gap between the bottom part 1 and the top part 2 can be adjusted by adjusting the length of the arm 231 of each hook 23 to allow the first and second control ropes L1, L2 be smoothly wrapped around the first and second scrolling wheels 83, 93. The first and second control ropes L1, L2 at different positions will not interfere each other to smoothly operate the window curtain assembly.

The first curtain 10 is an empty space, or the first curtain 10 includes different levels of light transmittance compared with that of the second curtain 7 so as to achieve purposes of light adjustment and light blocking.

While we have shown and described the embodiment in accordance with the present invention, it should be clear to those skilled in the art that further embodiments may be made without departing from the scope of the present invention.

What is claimed is:

1. A combination of window curtain assembly and control rope guide device for the window curtain assembly, comprising:

a bottom part and a top part which is connected to a top of the bottom part, the bottom part including an upright portion, two flanges respectively extending from two respective lower portions of two respective ends of the upright portion, a hole defined centrally through the upright portion, the upright portion including two grooves, and each groove extending upward toward the hole from the flange corresponding thereto, each groove including a plate located therein, a rivet engaged with the hole, the upright portion being a hollow case which includes multiple openings, an inclined wing located between two adjacent openings, and the top part including a handle, two protrusions and two hooks, two bridges respectively formed between the two protrusions and the handle, the two hooks extending from an underside of the top part, each of the protrusions including a recess defined therein, the two respective recesses respectively defined through the bottom of the top part, each recess receiving a rod which is located between one of two first control ropes and one of two second control ropes of the window curtain assembly, the two hooks hooking the two plates in the two grooves to connect the top part to the bottom part.

2. The control rope guide device for the window curtain assembly as claimed in claim 1, wherein the rivet is made of metal.

3. The control rope guide device for the window curtain assembly as claimed in claim 1, wherein the handle includes an anti-slip face coated thereto.

4. The control rope guide device for the window curtain assembly as claimed in claim 1, wherein the rods are cylindrical rods and made of metal.

5. The control rope guide device for the window curtain assembly as claimed in claim 1, wherein the hooks each include an arm and a hook end.

6. The control rope guide device for the window curtain assembly as claimed in claim 3, wherein the anti-slip face of the handle includes bosses, ridges or grooves.

7. The control rope guide device for the window curtain assembly as claimed in claim 1, wherein the window curtain assembly comprises a top rail, a middle rail and a bottom rail, the top rail includes a separation bottom and two bores are defined through the separation bottom;

a first curtain connected between the middle rail and the top rail;

a second curtain connected between the middle rail and the bottom rail;

the bottom part connected to the separation bottom of the top rail, the upright portion extending through the bores to connect the bottom part to the separation bottom, the hooks of the top part hook the plates of the bottom part;

a first scrolling member and a second scrolling member located in the top rail, the first scrolling member including a first top board and a first bottom board, two first scrolling wheels and two first driving wheels located between the first top board and the first bottom board, the second scrolling member including a second top board and a second bottom board, two second scrolling wheels and two second driving wheels located between the second top board and the second bottom board, multiple columns respectively connected between the first and the second top boards and the first and the second bottom boards, the two first scrolling wheels engaged with the two first driving wheels, a first spring driving the two first driving wheels so as to drive each of the first scrolling wheels, the two second scrolling wheels engaged with the two second driving wheels, a second spring driving the two second driving wheels so as to drive each of the second scrolling wheels;

the two first control ropes each having a first end connected to the first scrolling wheel corresponding thereto, a second end of each of the first control ropes extending through the rivet engaged with the hole of the bottom part and the first curtain, and being connected to the middle rail;

the two second control ropes each having a first end connected to the second scrolling wheel corresponding thereto, a second end of each of the second control ropes extending through the rivet engaged with the hole of the bottom part and the first and second curtains, and being connected to the bottom rail, the rods of each top part separating the first and second control ropes apart from each other, and a recovery force from each of the first and second springs driving the first and second driving wheels to rotate, the first and second driving wheels respectively drive the first and second scrolling wheels to rotate, so that the first scrolling wheels operate the first control ropes to lift or lower the middle rail to collect or expand the first curtain, or the second scrolling wheels operate the second control ropes to lift or lower the bottom rail to collect or expand the second curtain.

8. The control rope guide device for the window curtain assembly as claimed in claim 7, wherein multiple pillars are connected between the first and the second top boards and the first and the second bottom boards, the pillars guide the first and the second control ropes.

9. The control rope guide device for the window curtain assembly as claimed in claim 7, wherein the first curtain includes different levels of light transmittance compared with that of the second curtain.

* * * * *